United States Patent
Kidachi et al.

(10) Patent No.: US 7,401,847 B2
(45) Date of Patent: Jul. 22, 2008

(54) DOOR FOR VEHICLE WITH VIBRATION SUPPRESSION

(75) Inventors: Junichi Kidachi, Wako (JP); Masanori Koike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/683,704

(22) Filed: Mar. 8, 2007

(65) Prior Publication Data
US 2007/0210612 A1    Sep. 13, 2007

(30) Foreign Application Priority Data
Mar. 9, 2006 (JP) ............... 2006-064520
May 19, 2006 (JP) ............... 2006-139733

(51) Int. Cl.
*B60R 27/00* (2006.01)

(52) U.S. Cl. .............. 296/187.12; 296/187.03

(58) Field of Classification Search ............. 296/146.6, 296/146.5, 187.03, 187.12
See application file for complete search history.

(56) References Cited

U.S. PATENT DOCUMENTS

| | | | | |
|---|---|---|---|---|
| 6,039,387 | A * | 3/2000 | Choi | 296/187.12 |
| 6,053,565 | A * | 4/2000 | Cho | 296/187.12 |
| 6,135,541 | A | 10/2000 | Geise et al. | |
| 6,364,398 | B1 * | 4/2002 | Kim | 296/146.6 |
| 6,382,707 | B1 | 5/2002 | Dunneback | |
| 2002/0093219 | A1 | 7/2002 | Traister et al. | |
| 2002/0171260 | A1 * | 11/2002 | Schneider | 296/146.6 |

FOREIGN PATENT DOCUMENTS

| | | |
|---|---|---|
| DE | 197 55 935 | 6/1998 |
| JP | 2005-081880 | 3/2005 |
| WO | 02/14109 | 2/2002 |
| WO | 02/092393 | 11/2002 |

* cited by examiner

*Primary Examiner*—Lori L Lyjak
(74) *Attorney, Agent, or Firm*—Rankin, Hill & Clark LLP

(57) ABSTRACT

A door includes an inner panel, an outer panel, a door beam fixed to the inner panel, hinges, and a door lock unit. The door beam is connected at one end to one end side face of the inner panel at a first location and at the other end thereof to the other end side face at a second location higher or lower than the first location along a substantial diagonal of the outer panel. A first vibration damping member intervenes between the door beam and the outer panel to have contact with the door beam and the outer panel. A second vibration damping member may be further arranged above or under the door beam inside the outer panel. A third vibration damping member including a patch member may be attached to an interior face of the outer panel.

5 Claims, 11 Drawing Sheets

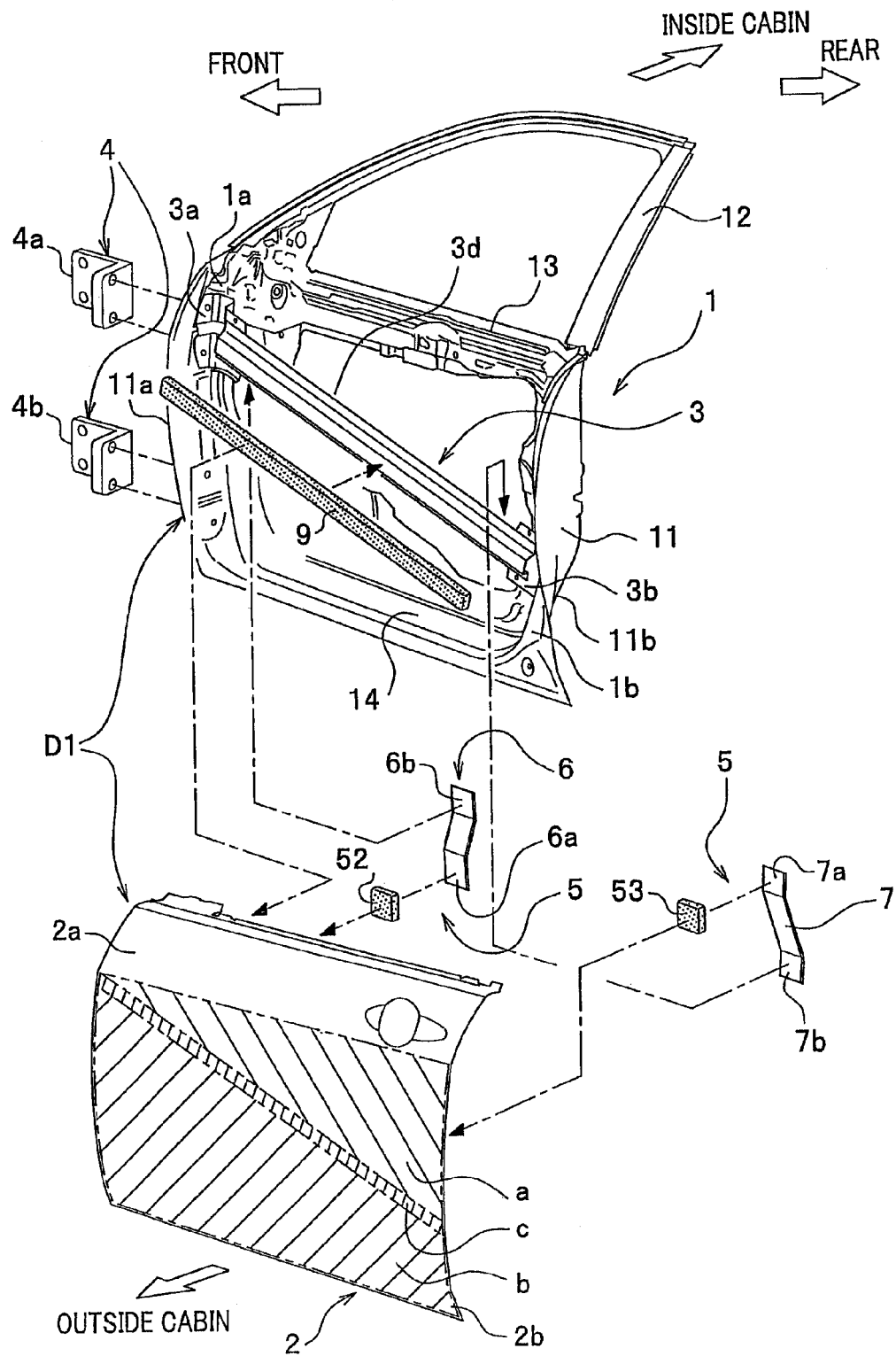

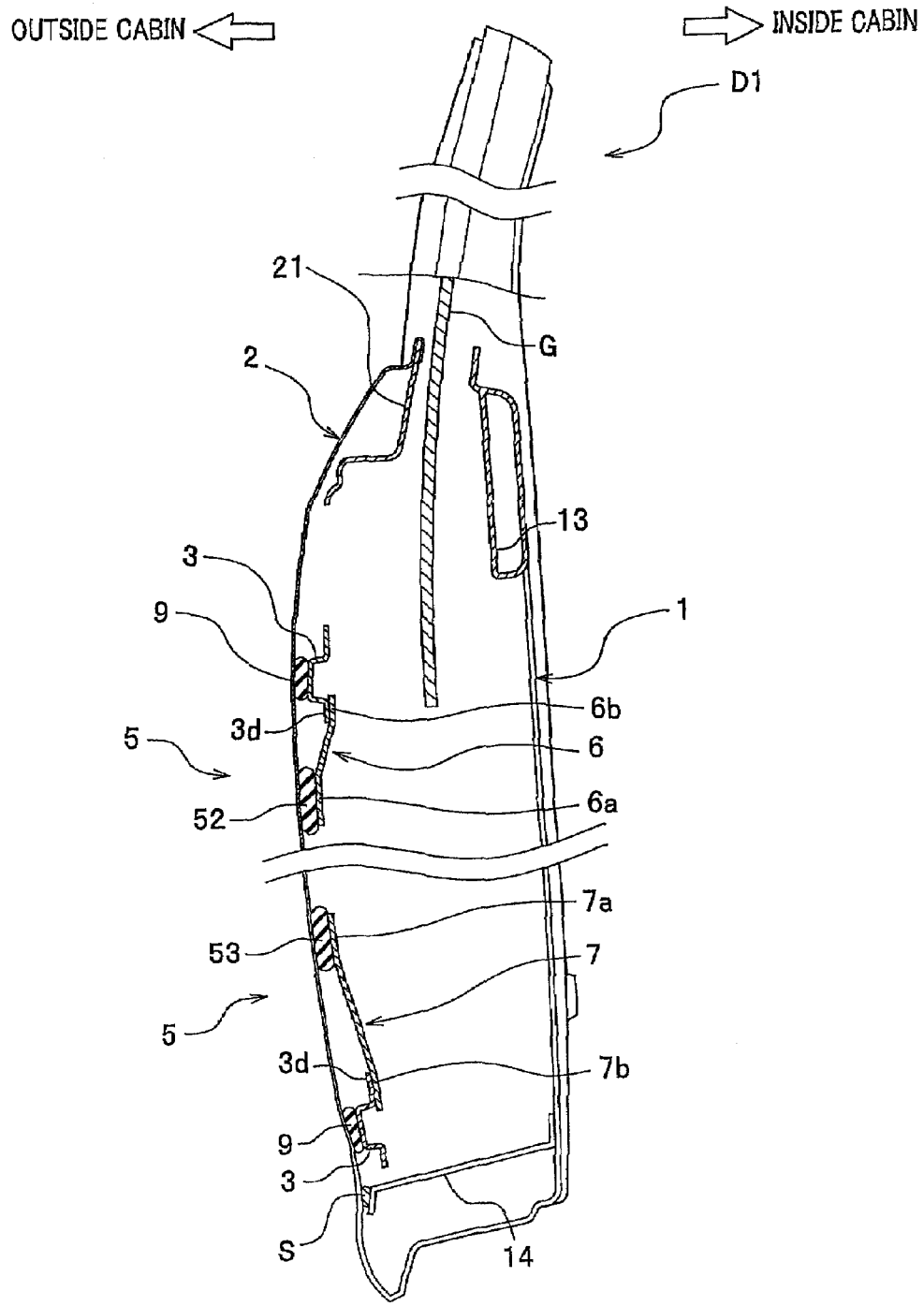

DOOR FOR VEHICLE WITH VIBRATION SUPPRESSION

CROSS REFERENCE TO RELATED APPLICATIONS

The present application claims benefit of the filing date of Japanese patent application No. 2006-064520 filed on Mar. 9, 2006 and Japanese patent application No. 2006-139733 filed on May 19, 2006, which are incorporated herein by reference.

1. Field of the Invention

The present invention relates to a door for a vehicle with vibration suppression.

2. Description of the Related Art

A door for a vehicle in which vibrations of an outer panel in closing the door are suppressed is known. Japanese Laid-open Patent Application Publication No. 2005-81880 (paragraphs 0023~0025, FIGS. 1-4) discloses such a door in which a vibration suppressing member (plate) is connected at one end thereof to an inner panel and at the other end thereof to an outer panel at a place a quarter of diagonal of the outer panel away from an intersection of the diagonals of the outer panel. In this door structure, when a driver closes the door the vibration suppressing member causes the door to generate a door-closing sound in which low frequency components are enhanced.

SUMMARY OF THE INVENTION

A first aspect of the present invention provides a door for a vehicle comprising: an inner panel; an outer panel, fixed to the inner panel, arranged outside the inner panel regarding the vehicle; a hinge member for connecting one end side face of the inner panel to the vehicle to pivotably support the door in a substantially vertical position; a door locking unit at the other end side face of the inner panel for locking the door with respect to the vehicle; a door beam fixed at one end thereof to a first location of one end of the inner panel and at the other end thereof to a second location of the other end of the inner panel higher or lower than the first location; a first vibration damping member comprising an elastic member, intervening between the outer panel and the door beam, having contact with an inside face of the outer panel and a surface of the door beam; and a second vibration damping member arranged on the inside face of the outer panel under or above the door beam.

According to the first aspect of the invention, preferably, the door beam is arranged slantwise, i.e., on a substantial diagonal of the inner panel. In the door supported in a vertical position, the door beam may be in contact with the outer panel through the first vibration damping member above or under the door beam to suppress the vibrations transmitted between one end and the other end of the door.

Preferably, the vibrations are suppressed, and a stiffness of the outer panel is enhanced to provide a preferable door-closing sound.

A second aspect of the present invention provides the door based on the first aspect, wherein the second vibration damping member includes a bracket extending upward or downward from the door beam and a sub-damping member intervening between the bracket and the outer panel.

According to the second aspect, the vibration damping member is arranged on the door beam, a bracket extends upward or downward from the door beam, and the sub-damping member intervenes between the bracket and the outer panel to absorb the vibration and suppress the door closing sound.

A third aspect of the present invention provides the door based on the second aspect, wherein the second vibration damping member comprises a pair of the brackets including first and second brackets extending upward and downward from the door beam, respectively.

According to the third aspect of the present invention, preferably, the first and second brackets extending upward and downward from the door beam and the sub-damping members intervening between the outer panel and the first and second brackets to efficiently absorb the vibrations of the outer panel.

A fourth aspect of the present invention provides the door based on the first aspect, further comprising a third vibration damping member including a patch member attached to an inside face of the outer panel.

According to the fourth aspect, the patching member as the third vibration damping member is arranged on the interior face of the outer panel to further absorb the vibrations of the outer panel. The outer panel may have an improved stiffness due to the use of the patching member.

A fifth aspect of the present invention provides the door based on the first aspect, wherein the patching member comprises first and second patches arranged at locations on the outer panel opposite to each other with respect to the door beam.

According to the fifth aspect, the patching member includes first and second patches arranged at locations on the outer panel opposite to each other with respect to the door beam, so that the vibrations of the door can be efficiently suppressed.

A sixth aspect of the present invention provides the door based on the first aspect, wherein the inner panel is formed in a substantially rectangular shape, the hinge member comprises upper and lower hinges, the door beam at one end thereof is fixed to the upper hinge and at the other end thereof is fixed a lower corner of the other end of the inner panel.

According to the sixth aspect of the present invention, one end of the door beam may be connected to the upper hinge to reinforce the door, and the other end is connected to the lower corner of the other end of the inter panel. Thus, the door beam is arranged on the substantial diagonal of the inter panel to keep the stiffness. In addition, at an upper part of the other end of the outer panel may be arranged an outside handle and the door lock unit, which suppress the vibrations at the other end where the other end is largely swung during closing the door to provide a favorable door-closing sound.

BRIEF DESCRIPTION OF THE DRAWINGS

The object and features of the present invention will become more readily apparent from the following detailed description taken in conjunction with the accompanying drawings in which:

FIG. 2 is an exploded view for illustrating the door according to the first embodiment of the present invention;

FIG. 3 is a cross-sectional side elevation view for illustrating an arrangement of first and second brackets according to the first embodiment;

The same or corresponding elements or parts are designated with like references throughout the drawings.

DETAILED DESCRIPTION OF THE INVENTION

Prior to describing embodiments of the present invention, the above-mentioned related art will be further explained.

In the above-mentioned prior art, the vibration suppressing member connected to the inner panel is arranged at a partial place on the diagonal of the outer panel. Thus the vibration suppressing member can suppress the vibrations only at the partial place on the diagonal.

Further, in the door structure of the vehicle, the vibration suppressing member cannot be arranged at an appropriate position in accordance with a shape or a size of the door.

The present invention provides a door structure of a vehicle capable of generating a preferable door-closing sound in which vibrations due to closing door are suppressed.

First Embodiment

With reference to FIGS. 1 to 4 will be described a door of a vehicle according to a first embodiment of the present invention.

Figure 1:
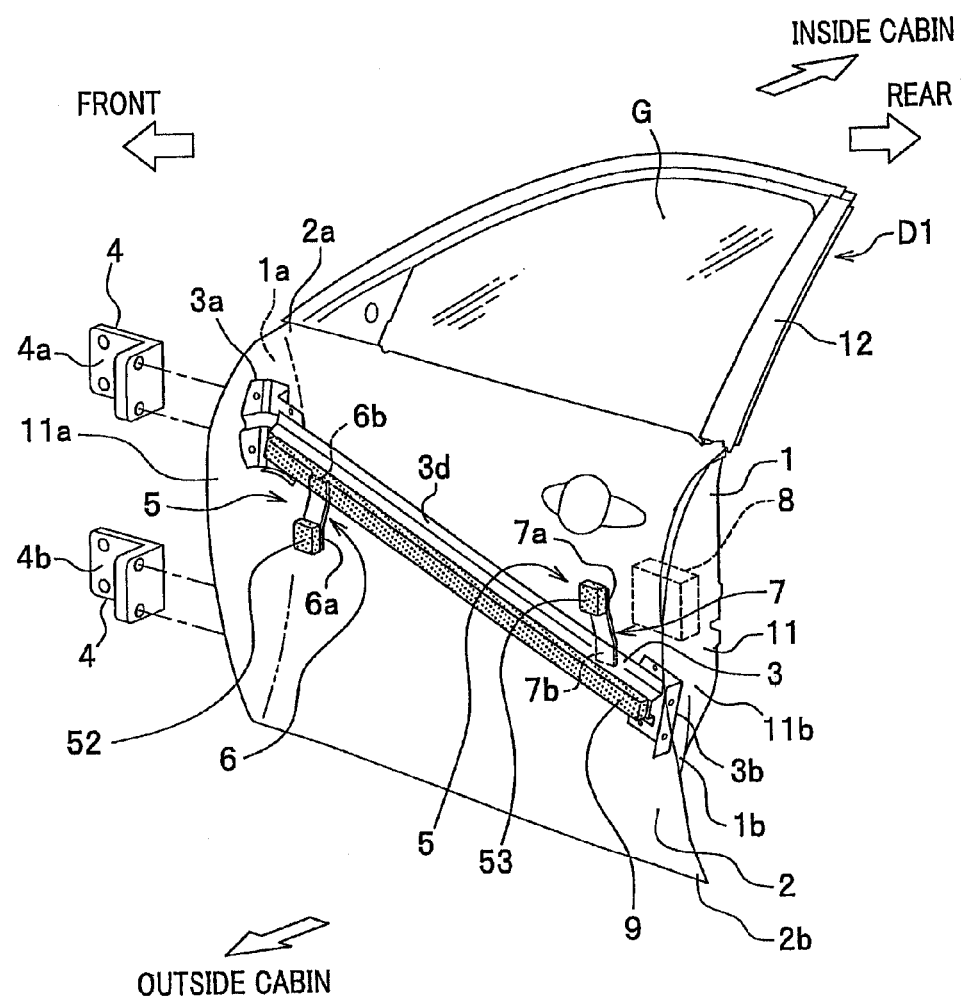
FIG. 1 is a perspective view of a door for illustrating an arrangement of a door beam and members for damping according to a first embodiment of the present invention.

FIG. 1 illustrates an arrangement of a door beam and vibration suppressing members (damping members). FIG. 2 illustrates the door in an exploded perspective view. FIG. 3 illustrates an arrangement of first and second brackets shown in FIGS. 1 and 2. FIGS. 4A to 4D show data of behaviors of the door measured regarding vibrations in closing the door.

In the embodiments and the drawings of the present invention, "front" indicates a front side of the vehicle; "rear", a rear side of the vehicle; "up", a vertical upper side; and "low", a vertical lower side. Further, "inside" or "interior" means inside of the cabin of the vehicle, and "outside", and "exterior" means outside of the cabin of the vehicle otherwise specified. Further, "inside of the door" is defined as "inside the cabin of the vehicle".

[Door Closing Sound]

Prior to describing the first embodiment of the present invention, with reference to FIGS. 4A to 4D will be described generation of a door closing sound.

It is preferable to make a door closing sound a harmonized beautiful sound or an exclusive powerful sound to give a driver a comfortable feeling.

FIGS. 4A to 4D show a measurement result conducted by the inventors to analyze generation of the door closing sound according to the present invention.

Figure 4A:
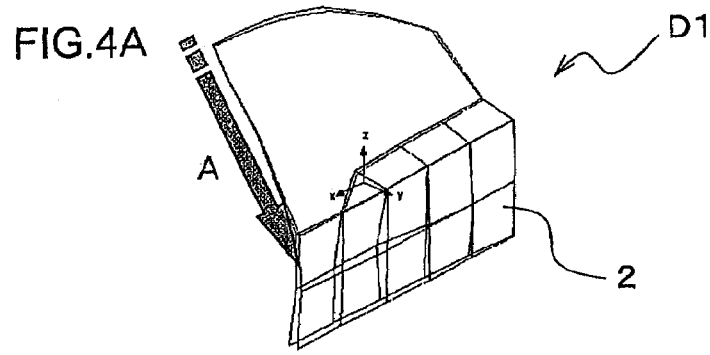
FIGS. 4A to 4D show a measurement result made by the inventors to analyze generation of the door closing sound according to the present invention.
Figure 4B:
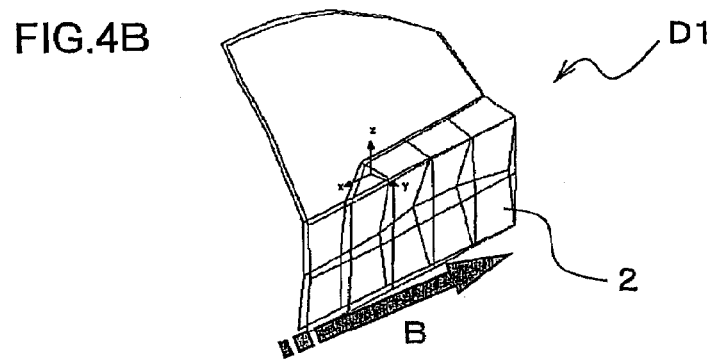
Figure 4C:
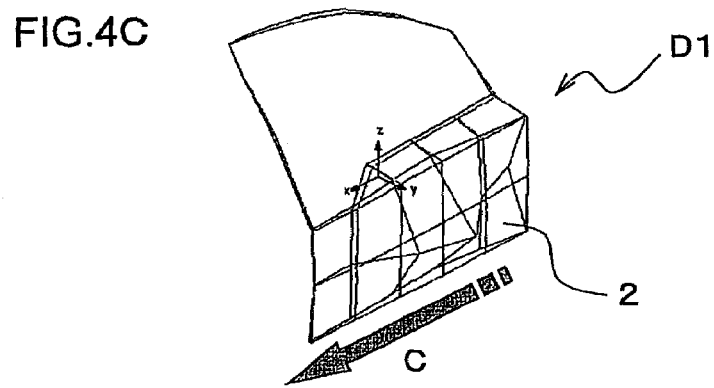
Figure 4D:
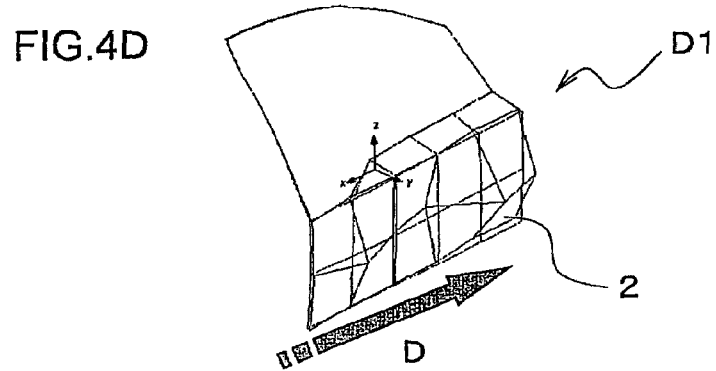

The door closing sound is generated as shown in FIGS. 4A to 4D. When a door D1 is closed, collision vibrations are generated at an upper sash of the door D1 and propagate in a direction indicated by an arrow A as shown in FIG. 4A to a lower end of an outer panel 2 and then transmit forward and rearward as indicated by arrows B, C, and D, so that the outer panel 2 oscillates at a natural frequency of the outer panel 2.

The inventors conducted an experiment on the basis of this analysis. The experiment shows that the door closing sound can be made preferable by arranging, as shown in FIGS. 1 and 2, a main damping (vibration suppressing) member 9 on one substantially diagonal of the outer panel 2 to provide a contact thereof with an interior (regarding a cabin of the vehicle) face of the outer panel 2 as well as arranging vibration suppressing members 5 above and under the door beam 3.

With reference to FIGS. 1 to 3 will be descried the door D1 capable of giving a preferable closing sound.

[Door Structure]

As shown in FIGS. 1 to 3, a door D1 of a hinge type is arranged, for example, on a left side of a front seat on a body of the vehicle. Hereinafter, a hinge and rear-open type of the door D1 arranged on the left side of the front seat is exemplified. The door D1 mainly includes an inner panel 1 as a substructure of the door D1, the outer panel 2 fixed on an outside (regarding the cabin of the vehicle) of the inner panel 2, a door beam 3 fixed to the inner panel 1, the vibration suppressing members (vibration damping members) 5 for anti-vibration arranged above or under the door beam 3, hinges 4 for pivotably supporting the door D1 relatively to the body of the vehicle, and a door lock unit 8 for holding the door D1 in a closing state.

Further, the door D1 is provided with a lining (not shown) arranged on an interior side of the inner panel 1, a window unit (not shown) for ascending and descending a window glass C, an inside handle (not shown) and an outside handle (not shown), electric devices (not shown) for the window unit and the like, and rubber frames (not shown) arranged around the frame of the door D1. In addition, the door D1 may be a so-called hybrid door including an inner panel 1 made of steel and an outer panel 2 made of light metal such as an aluminum alloy and a magnesium alloy.

[Inner Panel Structure]

As shown in FIG. 2, the inner panel 1 is a frame member of the door D1 formed in a substantially rectangle shape. The inner panel 1 on a front side face (one end side face) 11a thereof is pivotably connected by the upper and lower hinges 4a and 4b to the body of the vehicle, and the rear part (the other end side face) 11b has the door lock unit 8 (see FIG. 1) to hold the door closing state The inner panel 1 is formed of a metal such as steel. The inner panel 1 includes: a frame body 11 of which exterior side is connected to the door beam 3a and further a sash 12 for supporting the window glass G (see FIG. 1), an upper inner frame 13 extending in the front-rear direction, and an under frame 14, which are welded on the frame body 11.

As shown in FIG. 2, the outer panel 2 is fixed to the frame body 11 by welding and a heming process to uppermost edges of the frame body 11 and a lowermost edge the frame body 11.

To an upper part of the front side face 11a of the frame body 11 are fixed an upper hinge 4a arranged outside the cabin and a front end 3a of the door beam 3 arranged inside the cabin with a common fastening member such as a bolt. The front side face 11a at an uppermost part thereof is connected to a front part of the sash 12 by welding.

To a lower part of the front side face 11a of the frame body 11 is fixed a lower hinge 4a arranged outside the cabin with a common fastening member such as a bolt.

A rear end 3b of the door beam 3 is fixed to a lower end part of the frame body 11 inside a rear end side face 11b. Further, the rear side face 11b is provided with, the door lock unit 8 (see FIG. 1).

As shown in FIG. 2, the sash 12 is a window frame for the window glass G (see FIG. 1) in which the front part and a rear part on a lower side thereof are connected to an upper front end and an upper rear end of the frame body 11 by welding, respectively. The sash 12 and the frame body 11 may be integrally molded. In addition, the sash 12 may be omitted like a hard top type of automobile.

[Structure of Outer Panel]

As shown in FIG. 1, the outer panel 2 is made of a rolled plate of a light metal such as an aluminum alloy and a magnesium alloy. The outer panel 2 is fixed to a periphery of the frame body 11 of the inner panel 1 both by the heming process and a welding process (in a case of the light metal alloy plate, a structural adhesive S (see FIG. 3) is used).

FIG. 3 shows cross sections of the door D1 made at locations of a first bracket 6 and a second bracket 7.

As shown in FIG. 3, an interior face of the outer panel 2 is connected to the other end 6a of the first bracket 6 and the other end 7a of the second bracket 7 through sub-damping members 52 and 53 having adhesiveness. More specifically the other ends 6a and 7a are connected to the outer panel 2 with the sub-damping members 52 and 53 for allowing changes in relative positional relations (a minute movement), so that an error caused by assembling the door beam 3 and the outer panel 2 can be absorbed.

In addition, the outer panel 2 is provided with an upper outer frame 21 for reinforcing the outer panel 2 at the upper part thereof and a lower frame 14 with the structural adhesive S and rivets (not shown). The outer panel 2 is provided with an outside handle (not shown) around a rear end part of the outer panel 2.

[Door Beam]

As shown in FIG. 2, the door beam 3 is diagonally arranged. A front end (one end) 3a of the door beam 3 is connected to a front side face (one end side face) 11a of the inner panel 1 with the fastening member, and a rear end (the other end) 3b of the door beam 3 is connected to the rear side face (the other end) 11b at a location of which is lower (FIGS. 1 to 3) or higher than a location of the front end 3a with a fastening member such as rivets or the like. The door beam 3 is provided with the vibration suppressing members 5 above and under the door beam 3, respectively. The door beam 3 is arranged along a substantial diagonal (one diagonal) of the frame body 11 having a substantially rectangular form.

As shown in FIGS. 1 and 2, the door beam 3 serves, for example, as a reinforcing member for the inner panel 1, wherein the door beam 3 is a metal member in which edges of a flanged channel steel are folded for reinforcement. The door beam 3 is formed integrally with the flanges 3d of bands extending upward and downward.

The door beam 3 is provided with a first bracket 6 welded to a flange 3d located on a lower side of the front end 3a so as to extend downward and a second bracket 7 welded to a flange 3d located on an upper side of the rear end 3b so as to extend in an opposite direction (see FIG. 3).

As shown in FIGS. 1 and 2, the door beam 3 is connected to the upper hinge 4a through the front side face 11a of the inner panel 1 with a fastening member such as a bolt as well as the rear end (the other end) 3b is connected to a lower corner 1b of the rear end (the other end) 11b with a fastening member.

[Main Damping Member]

As shown in FIG. 3, the main damping member (vibration suppressing member) 9 arranged on the door beam 3 absorbs vibrations generated by an impact in closing the door D1 to control a distribution of frequency components of the door closing sound and for suppressing vibrations of the door D1 generated during traveling. As the main damping member 9 for example, a mastic sealer is usable having the same adhesiveness as the sub-damping members 52 and 53 and a capability of a relative displacement. The main damping member 9 intervenes between the door beam 3 and the outer panel 2 and is adhered both to an exterior face of the door beam 3 and the interior face of the outer panel 2.

The mastic sealer (also referred to as a mastic adhesive) is a sealer having an elasticity used as an adhesive and cushioning member made of, for example, an epoxy resin.

[Vibration Suppressing Member]

The door D1 is provided with a pair of vibration suppressing members 5 and 5 for suppressing vibration of the outer panel 2. The vibration suppressing members 5 have the first bracket 6 extending downward from the door beam 3 with the sub-damping member 52 and a second bracket 7 extending upward from the door beam 3 with a sub-damping member 53.

The sub-damping members 52 and 53 are made of a soft material such as a synthetic rubber having elasticity allowing deformation in a direction in which the door D1 closes, so that vibrations of the outer panel 2, the first bracket 6, the second bracket 7, and the door beam 3 are absorbed. As a result, the vibration suppressing members 5 mainly attenuate middle frequency components influential on a tone of the closing sound of the door D1 to control the closing sound to have a powerful tone containing low frequency components having intensities greater than those of other frequency components.

[Sub-Damping Member]

The sub-damping members 52 and 53 are made of a synthetic resin having adhesiveness such as the mastic sealer and hot melt. The sub-damping members 52 and 53, like the main damping member 9 and a patch member 55 (see FIG. 10) later mentioned, are cushioning members (vibration suppressing members) for absorbing vibrations generated by an impact in closing the door D1 to control a distribution of frequency components of the door closing sound and for suppressing vibrations of the door D1 generated during traveling and thus made of a soft member such as a thermosetting type of synthetic rubber. The sub-damping members 52 and 53 are hardened by a heat applied, for example, during baking finish of the door D1.

The structural adhesive S is, for example, an epoxy adhesive for aluminum alloys.

[Bracket]

The first bracket 6 is fixed to the door beam 3 so as to extend downward. The second bracket 7 is fixed to the door beam 3 so as to extend in an opposite direction. The brackets 6 and 7 are fixed at one ends 6b and 7b thereof to the door beam 3 and at the other ends 6a and 7a thereof to the outer panel 2 through the sub-damping members 52 and 53 to provide connection between the door beam 3 and the outer panel 2.

[First and Second Brackets]

The first and second brackets 6 and 7 each have substantially the same shape made by folding a metal plate such as a steel plate to have an appropriate elasticity. The first and second brackets 6 and 7 fixed to the door beam 3 are each arranged at substantially symmetric positions about a point in the door beam 3. Thus, in a case that there is a space in the door D1, the first bracket 6 may be fixed to the door beam 3 so as to extend upward, and the second bracket 7 may be fixed to the door beam 3 so as to extend downward. In other words, as long as the first and second brackets 6 and 7 are fixed to the door beam 3 so as to extend in opposite directions and the space in the door permits, the extending direction of the first or second bracket can be selected.

More specifically, as shown in FIG. 3, the first bracket 6 is welded at one end 6b thereof to the flange 3d formed under the front end 3a (see FIG. 2) of the door beam 3 and adhered at the other end to the interior face (back) of the outer panel 2 through the sub-damping member 52.

The second bracket 7 is welded at one end 7b thereof to the flange 3d formed above the rear end 3b (see FIG. 2) of the door beam 3 and adhered at the other end to the interior face (back) of the outer panel 2 through the sub-damping member 53.

The door beam 3 is adhered to the interior face of the outer door panel 2 through the main damping member 9.

As mentioned above, the first and second brackets 6 and 7 are fixed at one ends 6b and 7b to the outer panel 2 through the door beam 3 and the main damping member 9 and at the other ends 6a and 7a to the outer panel 2 through the sub-damping members 52 and 53, respectively, to allow movement (relative displacement) against the outer panel 2.

[Hinges]

The upper and lower hinges 4a and 4b pivotably support the door D1 within a predetermined angle range and are fixed to upper and lower locations of the front side face 11a.

[Operation]

With reference to FIGS. 1 to 4 will be described an operation of the door according to the first embodiment.

When a passenger or a driver closes the door D1, the vibrations and the door closing sound due to impact in closing the door D1 are absorbed or suppressed by the main damping member 9 and the vibration suppressing members 5 including the sub-damping members 52 and 53 made of an elastic material.

The main damping member 9 is in contact with the outer panel 2 slantwise between an upper location of the front end of the outer panel 2 and a lower location of a rear end of the outer panel 2, so that vibrations of the outer panel 2 are damped, and a distribution of frequency components is controlled.

The door D1 generates a comfortable sound because the vibrations and the closing sound are absorbed as mentioned above to have an appropriate distribution of frequency components (low frequency components are relatively enhanced).

In addition, the outer panel 2 is fixed to the first and second brackets 6 and 7 connected to the door beam 3 through the sub-damping members 52 and 53. Thus, even though the first and second brackets 6 and 7 vibrate, the sub-damping members 52 and 53 absorb the vibrations to prevent the vibration from propagating to the outer panel 2.

Further, the outer panel 2 is adhered to the first and second brackets 6 and 7 through the sub-damping members 52 and 53 having adhesiveness and an elasticity to allow relative displacement, which absorbs or controls the vibrations due to the impact in closing door D1.

In addition, near the rear end of the outer panel 2 are arranged an outside handle (not shown) and the door lock unit 8 (see FIG. 1), which suppresses the vibrations of the outer panel 2 due to closing the door D1 to suppress frequency components other than the lower frequency components to provide a favorable door closing sound.

Second Embodiment

Figures 5A, 5B:
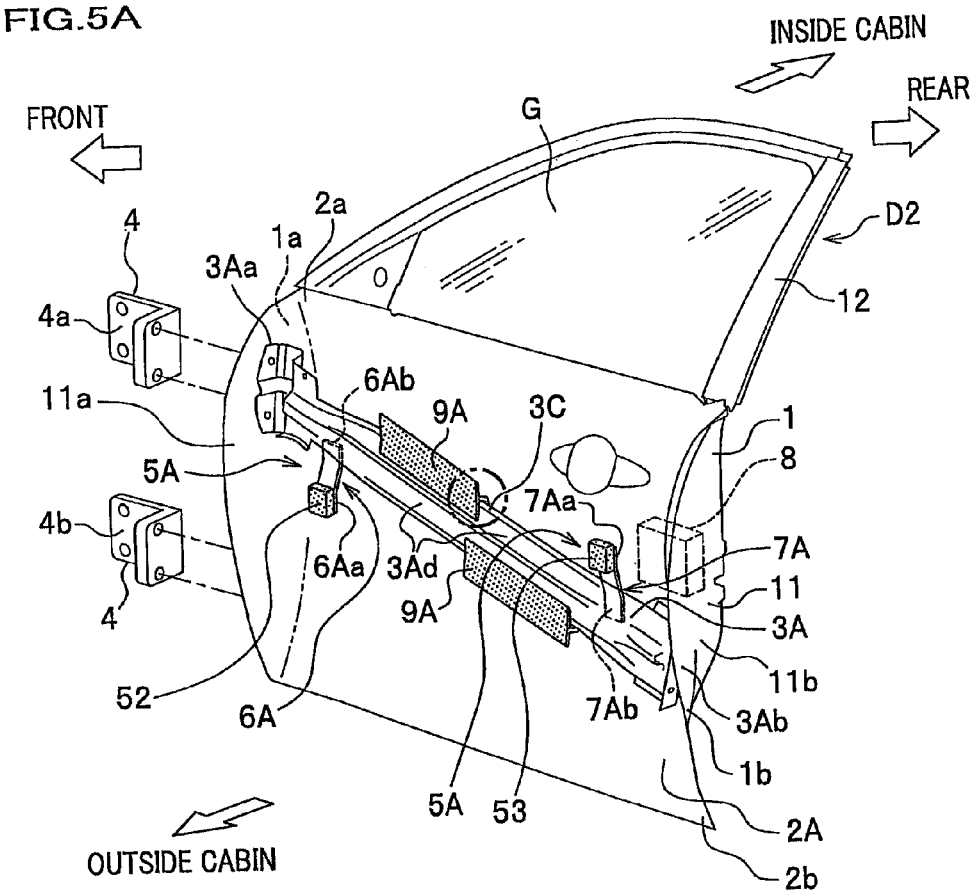
FIG. 5A is a perspective view of a door according to a second embodiment for illustrating an arrangement of the door beam and the damping members.
FIG. 5B is a partial enlarged cross-sectional view for illustrating a main damping member shown in FIG. 5A.
Figure 6:
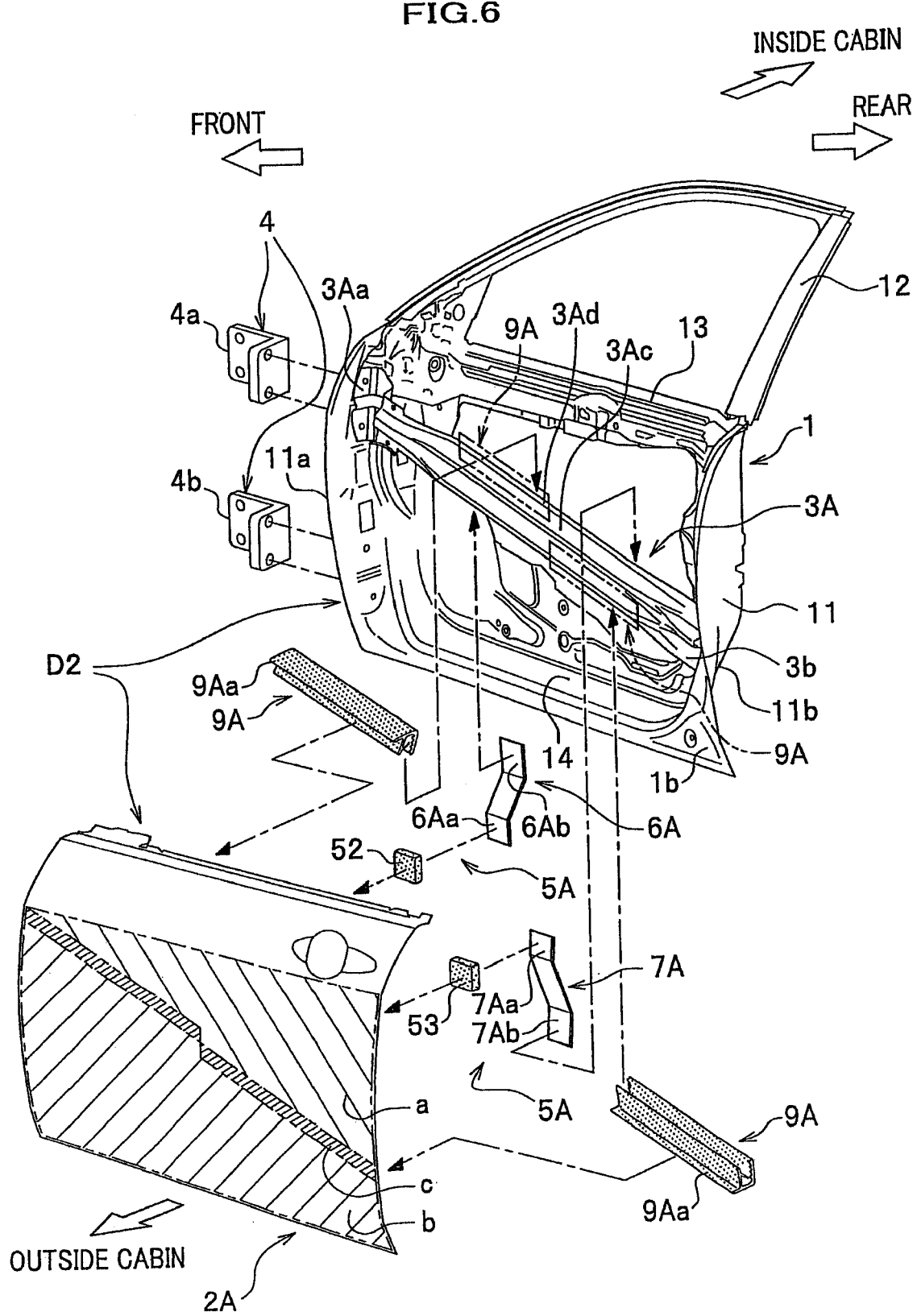
FIG. 6 shows an exploded perspective view of the door according to the second embodiment.
Figure 7:
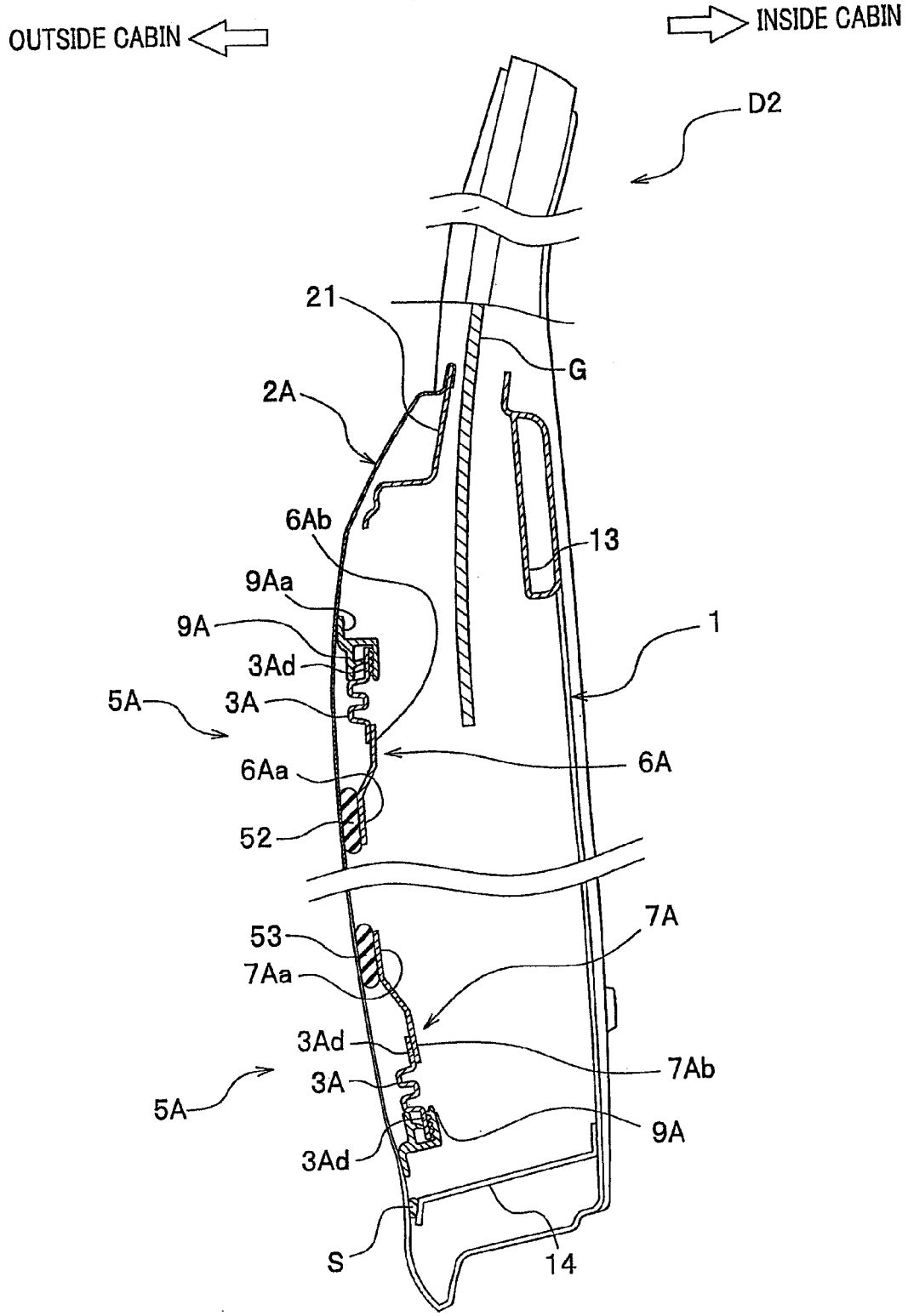
FIG. 7 is a cross-sectional side elevation view for illustrating an arrangement of first and second brackets according to the second embodiment.

With reference to FIGS. 5 to 7 will be described a door for a vehicle according to a second embodiment.

The same elements in the second embodiment as those in the first embodiment are designated with the same references, and thus a duplicated explanation will be omitted.

FIG. 5A shows a structure of the door D2 for a vehicle according to the second embodiment and illustrates an arrangement of the door beam and the damping members for vibration damping, and FIG. 5B is a partial enlarged cross-sectional view for illustrating the main damping member 9A. FIG. 6 shows an exploded perspective view of the door according to the second embodiment. FIG. 7 is a cross-sectional view of the door according to the second embodiment to show an arrangement of the first and second brackets 6A and 7A.

[Vibration Suppressing Member]

The vibration suppressing members 5A according to the second embodiment mainly include the sub-damping members 52 and 53, the first bracket 6A extending downward and the second bracket 7A extending upward from the door beam 3A.

[Damping Member]

The damping members 9A according to the second embodiment is made of an elastic member such as a rubber and a synthetic resin having a shape similar to a rubber frame (not shown) using a so-called weather strip mounted on flanges (not shown) at peripheries of the door D2.

More specifically, as shown in FIG. 5B, the damping member 9A is molded to integrally include a hard material part, a soft material parts, and a reinforcing member 9Ad, wherein the hard material forms a base part such as a mounting part 9Ac to be mounted on the flange 3Ad of the door beam 3A, and the soft material parts subjected to a two-color molding on the hard material part insert-molded for forming an elastical contacting part 9Aa and barbed members 9Ab.

The damping member 9A is mounted on the upper side of the door beam 3A so as to extend in the front-rear direction from the front end 3Aa to an intermediate part 3c by attaching the mounting part 9Ac to the flange 3Ad. Another damping member 9A is mounted on the lower side of the door beam 3A so as to extend in the front-rear direction from the intermediate part 3c to the rear end 3Ab by attaching the mounting part 9Ac to the flange 3Ad. The damping member 9A is arranged to have elasticity in a width direction substantially orthogonal to the door D1 when the door D1 is closed.

As shown in FIG. 5B, the damping member 9A fixed to the door D1 is in a curved status in which the contacting part 9Aa is always pressed to the interior face of the outer panel 2A. Thus, when the door D2 is closed, the outer panel 2A is elastically in contact with the door beam 3A outwardly with respect to the cabin to absorb the vibrations and the door closing sound.

The hard member is formed of a rubber or a synthetic resin which is hard to keep the shape of the mounting part 9Ac of the damping member 9A shown in FIG. 5B. In the hard material is insert-molded the reinforcing member 9A made of a metal plate material to have a structure which is difficult to be deformed to prevent the damping member 9A from being detached from the flange 3Ad.

The soft material is made of a soft rubber or a soft synthetic resin which is formed to be tightly in contact with the door beam 3A and the interior face of the outer panel 2A to control the vibrations.

The mounting part 9Ac has channels having a cross section which is substantially U shape to be attached to the flange 3Ad of the door beam 3A. On both walls inside the mounting part 9Ac are formed the barbed members 9Ab extending slantwise in inward directions of the mounting part 9Ac.

The damping member 9A thus configured attenuates the vibrations having middle frequencies influential on the tone of the closing sound of the door D1 to control the door closing sound to have a low-frequency-enhanced tone (having a high-grade door closing sound).

In the first embodiment, the main damping member 9 (see FIGS. 1 to 3) may have other forms. For example, the damping members 9A (a so-called whether strip) is usable as long as the main damping member 9 serves as a cushioning member (vibration suppressing member).

Third Embodiment

Figure 8:
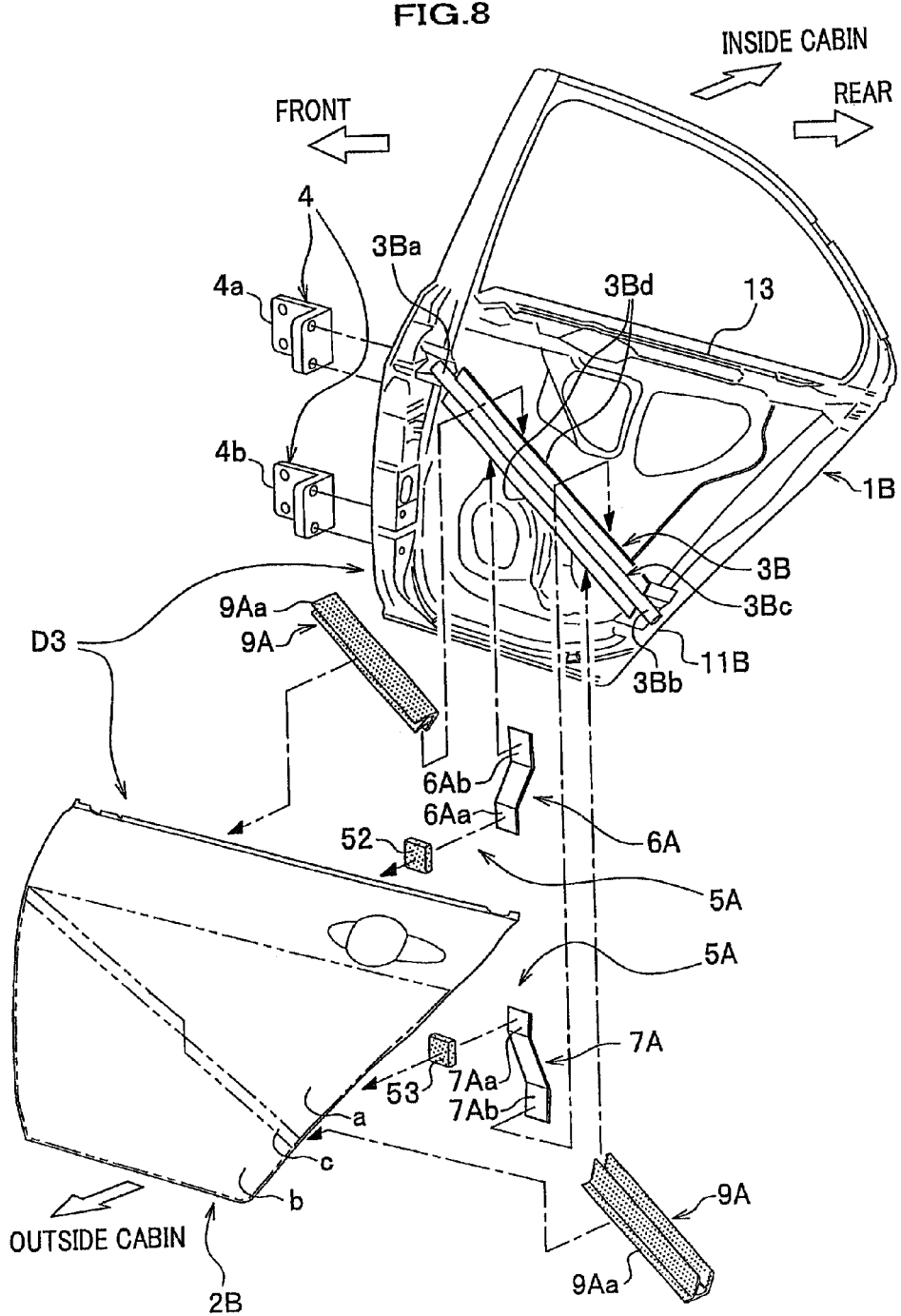
FIG. 8 is an exploded view for illustrating a door according to a third embodiment of the present invention.
Figure 9:
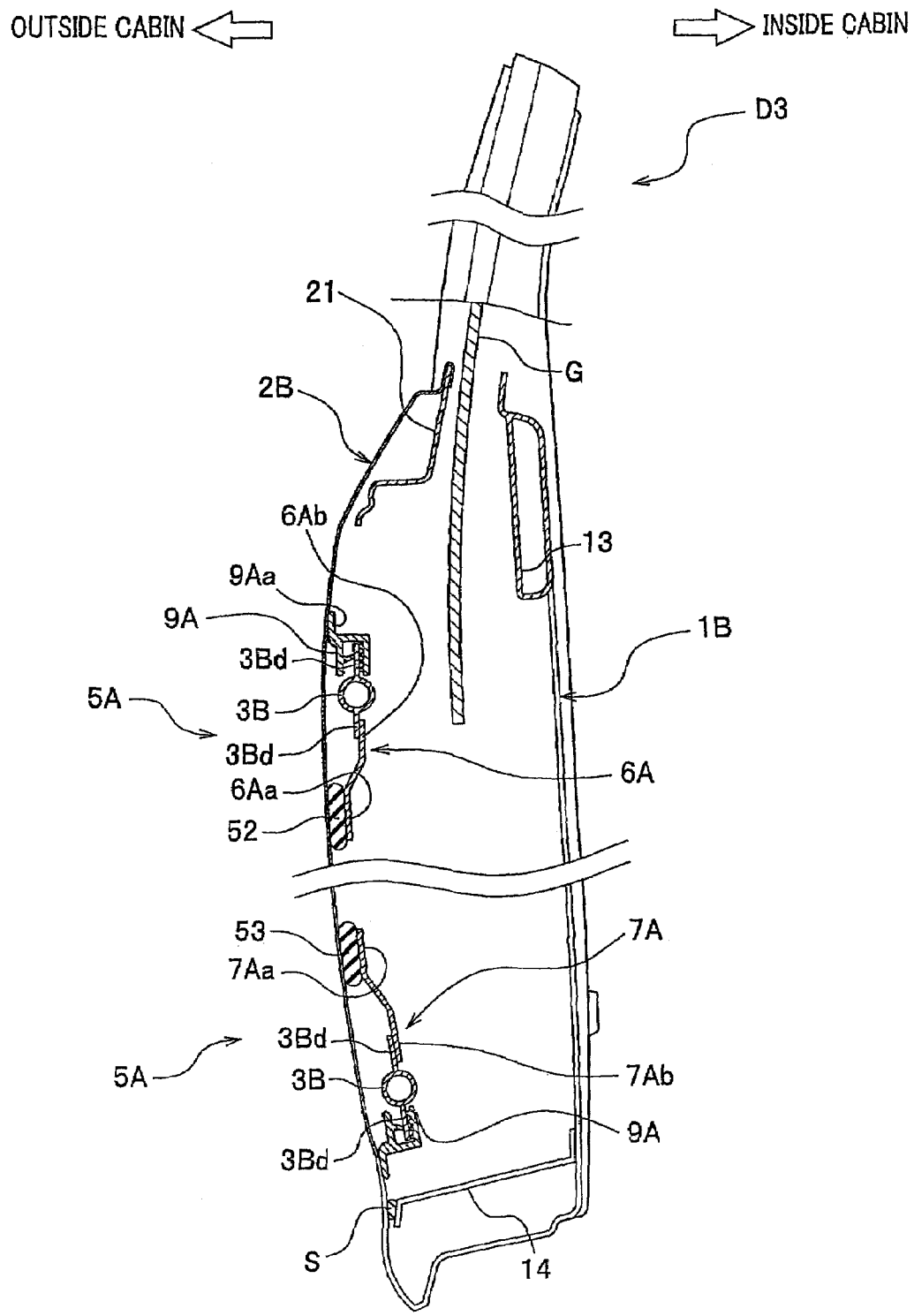
FIG. 9 is a cross-sectional side elevation view of the door according to the third embodiment.

With reference to FIGS. 8 and 9 will be described a door according to a third embodiment of the present invention.

In the third embodiment, the parts having the same functions as those explained in the first and second embodiments shown in FIGS. 1 to 7 are designated with the same references and thus a duplicated description will be omitted.

FIG. 8 is an exploded view for illustrating the door structure according to the third embodiment of the present invention. FIG. 9 is a cross-sectional side elevation view of the door according to the third embodiment.

The door D1 according to the first embodiment shown in FIGS. 1 to 3 can be modified as a rear door D3 in the third embodiment in which the door beam 3B is unlimited in shape as long as the door beam 3B has the flange 3Bd (see FIG. 9).

For example, the door beam 3B includes a pipe member of which a front end 3Ba and a rear end 3Bb are fixed to the frame body 11B of the inner panel 1B by welding or brackets and the like (not shown). On an intermediate part 3Bc between the front end 3Ba and the rear end 3Bb of the door beam 3B is welded a flange 3Bd made of a flat plate member extending upwardly.

The door D3 provides the same operation as the door D1 (see FIGS. 1 to 3) and the door D2 (see FIGS. 5 to 7).

Fourth Embodiment

Figure 10:
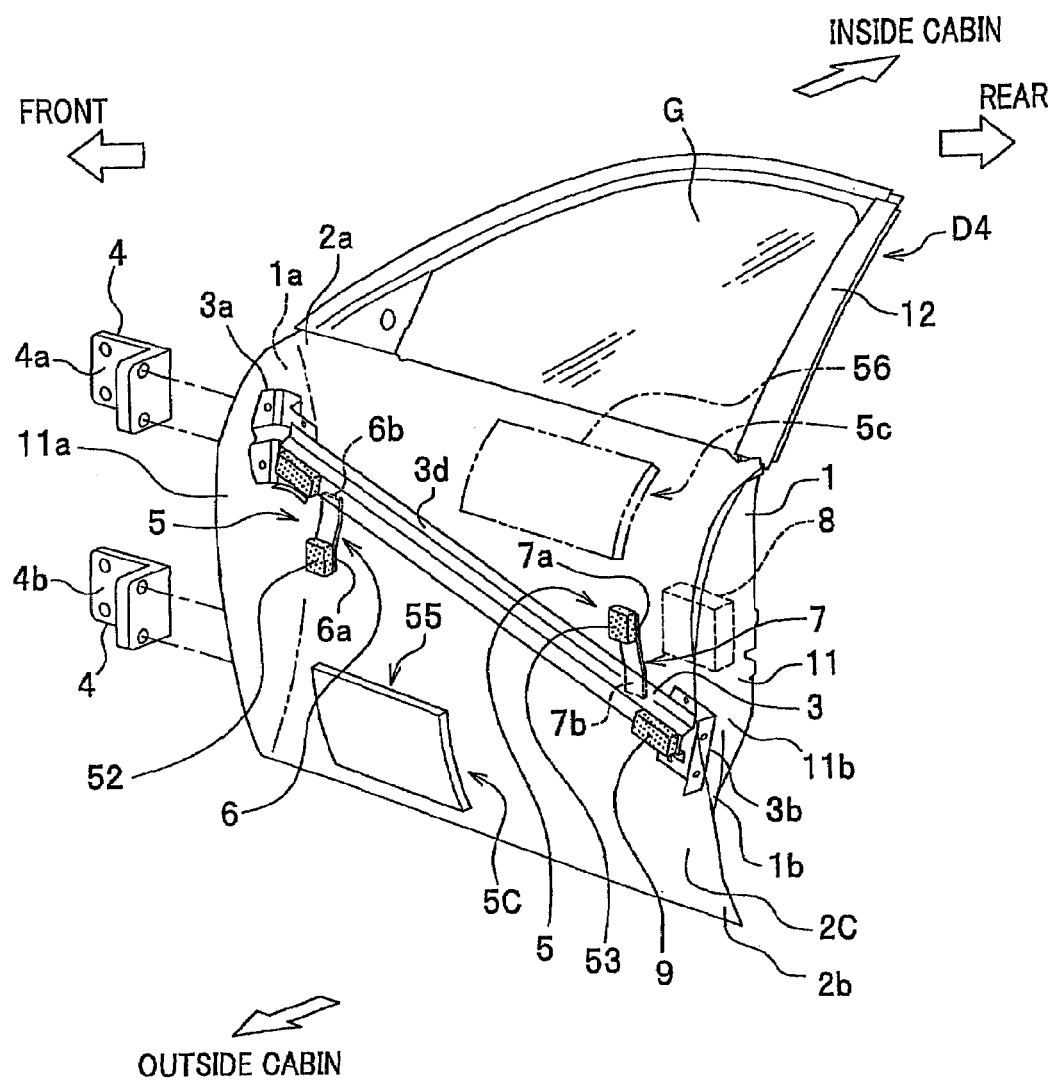
FIG. 10 is an exploded view for illustrating a door according to a fourth embodiment of the present invention.
Figure 11:
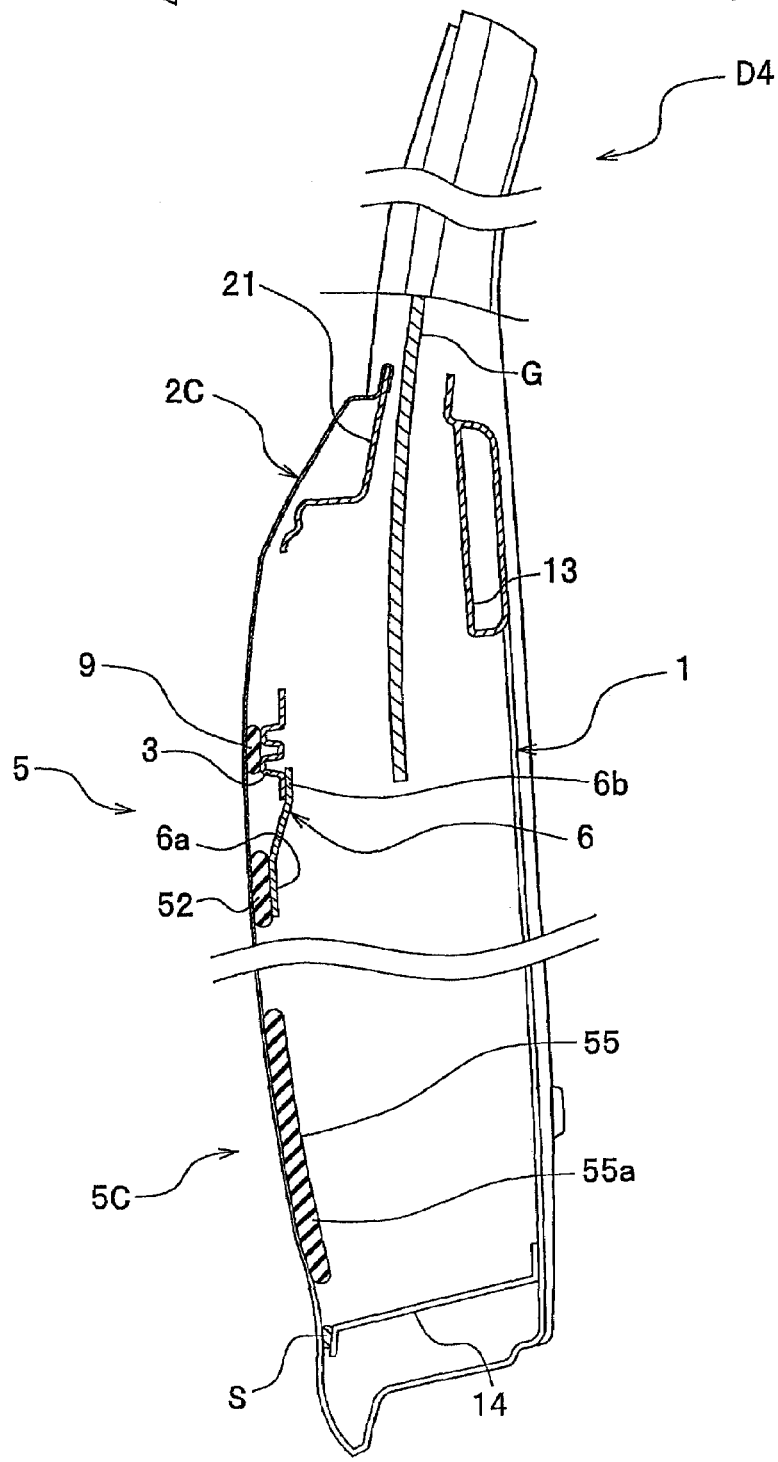
FIG. 11 is a cross-sectional side elevation view of the door according to the fourth embodiment.

With reference to FIGS. 10 and 11 will be described a door according to the fourth embodiment.

In the fourth embodiment, the parts having the same functions as those explained in the first to third embodiments shown in FIGS. 1 to 9 are designated with the same references and thus a duplicated description will be omitted.

FIG. 10 is an exploded view for illustrating the door structure according to the fourth embodiment of the present invention. FIG. 11 is a cross-sectional side elevation view of the door according to the fourth embodiment.

The vibration suppressing members 5 and 5A (see FIGS. 1 to 9) according to the first to the third embodiments can be modified as a vibration suppressing member 5C shown in FIGS. 10 and 11. More specifically, the vibration suppressing member 5C can be provided by first and second patching members 55 and/or 56 fixed to the interior face of the outer panel 2C above and/or under the door beam 3.

Further, the vibration suppressing member 5C may be provided both by the first patching member 55 and a second patching member 56 opposite to the first patching member with respect to the door beam 3 in which the number and shapes thereof are unlimited. FIG. 10 shows a case of only one patching member as the first patching member 55 by solid lines in FIG. 10. The second patching member 56 represented by the two-dot chain line shows an alternative case and the case where both the first and second patching members 55 and 56 are provided.

The patching members 55 and 56 may be made of a mastic sealer and the like which is deformable and has an adhesiveness which is the same as those of the sub-damping members 52 and 53 (see FIGS. 1 to 3) and suppresses transmission of the vibrations of the outer panel 2C. The patching members 55 are adhered to the outer panel 2C to provide a further effective vibration suppression in which the number and the shape of the patching members 55 are determined in accordance with a space on the outer panel 2C as shown in FIG. 10.

The first patching member 55 and the second patching member 56 are arranged opposite each other across the door beam 3. More 6 specifically, arranging the first patching member 55 and the second patching member 56 at places where vibrations in the door closing have large amplitudes can effectively suppress the vibrations and the door closing sound of the door D4.

Particularly, the damping member 9 prevents reflection inherent in the hybrid door including the inner panel 1 made of steel and the outer panel made of a light metal such as aluminum alloy, and the first and/or patching member 55 and/or 56 can generate a low frequency-enhanced sound which is generally defined as a high-grade door closing sound.

MODIFICATIONS

The present invention, unlimited to the first to fourth embodiments, may be modified.

For example, as shown in FIG. 1, the door beam 3 is arranged slantwise in which the rear end is lowered, wherein the front end 3a thereof is connected to the upper location of the front side part 11a and the rear end 3b there of is connected to the lower location of the rear end part 11b of the inter panel 1.

For example, it is sufficient to arrange the door beam 3 on a substantial diagonal of the inter panel 1, and thus, the door beam 3 becomes slantwise in which the rear end is lifted. More specifically, the front end 3a thereof is connected to a lower part of the front side face 11a and the rear end 3b there of is connected to an upper location of the rear end face 11b of the inter panel 1. More specifically, the door beam 3 is arranged to have a closed cross-sectional shape of a triangle or a trapezoid in the frame body 11 having a rectangular shape.

Further, in the embodiments, the door beam 3 is preferably arranged on the diagonal of the inner panel 1. However, it is sufficient to arrange the door beam 3 slantwise, and thus, the front end part 3a and the rear end part 3b may be shifted from the corners 2a and 2b of the outer panel 2 or the diagonal.

In this case, the first patching member 55 is arranged at a location shifted forward and the second patching member 55b is arranged at a location shifted rearward on the outer pane 2 from locations shown in FIG. 10.

As mentioned above, the door according to the present invention provides comfortable door closing sounds as well as a stiffness of the door is improved by connecting the door beam 3 to the outer panel 2 through the main damping members 9 and 9A. Further, the vibration suppressing members 5, 5A, and 5C are arranged above and under the door beam 3 to suppress the vibrations on the substantially diagonal of the outer panel 2 having a substantially rectangular shape.

In the fourth embodiment, the first and second patching members 55 and 56 have a predetermined mass to mainly absorb the vibrations of the outer panel 2, and further absorb the vibrations by elasticity thereof. The mass is determined in accordance with a frequency component to be suppressed. In addition, the first and second patching members 55 and 56 may have different masses. On the other hand, in the main damping member 9 and 9A and the sub-damping member 52 and 53 mainly absorb vibrations by elasticity thereof.

In the above mentioned embodiments, the first bracket 6 and 6A may have the same length as the second brackets 7 and 7A, but may have a different length from the second brackets 7 and 7A.

The invention claimed is:

1. A door for a vehicle comprising:
   an inner panel;
   an outer panel, fixed to the inner panel, arranged outside the inner panel regarding the vehicle;
   a hinge member for connecting one end side face of the inner panel to the vehicle to pivotably support the door in a substantially vertical position;
   a door locking unit at the other end side face of the inner panel for locking the door with respect to the vehicle;
   a door beam fixed at one end thereof to a first location of one end of the inner panel and at the other end thereof to a second location of the other end of the inner panel higher or lower then the first location;
   a first vibration damping member comprising an elastic member, intervening between the outer panel and the door beam, having contact with an inside face of the outer panel and a surface of the door beam; and
   a second vibration damping member comprising:
      a first bracket extending downwardly from the door beam and a second bracket extending upwardly from the door beam;
      a first sub-damping member comprised of an elastic member located below the door beam and situated between the first bracket and the inside face of the outer panel; and
      a second sub-damping member comprised of an elastic member located above the door beam and situated between the second bracket and the inside face of the outer panel.

2. The door as claimed in claim 1, further comprising a third vibration damping member including a patch member attached to an inside face of the outer panel.

3. The door as claimed in claim 2, wherein the patching member comprises first and second patches arranged at locations on the outer panel opposite to each other with respect to the door beam.

4. The door as claimed in claim 1, wherein the inner panel is formed in a substantially rectangular shape, the hinge member comprises upper and lower hinges, the door beam at one end thereof is fixed to the upper hinge and at the other end thereof is fixed a lower corner of the other end of the inner panel.

5. The door as claimed in claim 1, wherein the other end of the door beam is arranged lower than the one end of the door beam, the first bracket extends downwardly from the one end of the door beam, and the second bracket extends upwardly from the other end of the door beam.

* * * * *